United States Patent
Okidan

(10) Patent No.: US 9,912,196 B2
(45) Date of Patent: Mar. 6, 2018

(54) POWER RECEIVING DEVICE AND POWER FEEDING SYSTEM

(71) Applicant: THE CHUGOKU ELECTRIC POWER CO., INC., Hiroshima (JP)

(72) Inventor: Kazuma Okidan, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 45 days.

(21) Appl. No.: 15/023,356

(22) PCT Filed: Dec. 10, 2013

(86) PCT No.: PCT/JP2013/083130
§ 371 (c)(1),
(2) Date: Mar. 18, 2016

(87) PCT Pub. No.: WO2015/087398
PCT Pub. Date: Jun. 18, 2015

(65) Prior Publication Data
US 2016/0248275 A1    Aug. 25, 2016

(51) Int. Cl.
*H02J 17/00* (2006.01)
*H02J 50/10* (2016.01)
(Continued)

(52) U.S. Cl.
CPC .............. *H02J 50/10* (2016.02); *H02J 5/005* (2013.01); *H02J 50/12* (2016.02)

(58) Field of Classification Search
CPC ...................................................... H02J 17/00
(Continued)

(56) References Cited

U.S. PATENT DOCUMENTS

2009/0243397 A1* 10/2009 Cook ...................... H02J 5/005
307/104
2013/0313893 A1* 11/2013 Ichikawa ................ H02J 17/00
307/9.1

FOREIGN PATENT DOCUMENTS

CN          102239622 A        11/2011
CN          102884712 A         1/2013
(Continued)

OTHER PUBLICATIONS

Office Action issued in corresponding Korean Application No. 10-2016-7006365 dated Jan. 18, 2017, and English translation thereof (9 pages).
(Continued)

*Primary Examiner* — Rexford Barnie
*Assistant Examiner* — Joseph Inge
(74) *Attorney, Agent, or Firm* — Osha Liang LLP

(57) ABSTRACT

A power receiving device that receives electric power output from a power transmission device includes a primary side coil and supplies electric power to a load according to the electric power. The power receiving device includes: an adjusting device that adjusts a value of a third current to be a predetermined value, the third current is generated from the second current and supplied to the load; a detecting device that detects the third current; and a variable capacitor coupled between the secondary side coil and the load. The variable capacitor ensures a changeable capacitance value. The adjusting device performs an adjustment based on a detection result by the detecting device. The variable capacitor is coupled in series with the secondary side coil and the load. The adjusting device includes a first adjusting device that increases the capacitance value and a second adjusting device that decreases the capacitance value.

7 Claims, 13 Drawing Sheets

(51) Int. Cl.
*H02J 5/00* (2016.01)
*H02J 50/12* (2016.01)

(58) Field of Classification Search
USPC .......................................................... 307/104
See application file for complete search history.

(56) References Cited

FOREIGN PATENT DOCUMENTS

| CN | 103312043 A | 9/2013 | | |
|----|-------------|--------|---|---|
| EP | 2571140 A1 | 3/2013 | | |
| EP | 2637316 A1 | 9/2013 | | |
| JP | 2001-238372 A | 8/2001 | | |
| JP | 2010-141977 A | 6/2010 | | |
| JP | 2010-233354 A | 10/2010 | | |
| JP | 2010 239844 A | 10/2010 | | |
| JP | 2012-70566 A | 4/2012 | | |
| JP | 2012-120288 A | 6/2012 | | |
| JP | 2012120288 A | * | 6/2012 | ............ B60L 11/182 |
| JP | 2013-70590 A | 4/2013 | | |
| WO | 2013042224 A1 | 3/2013 | | |

OTHER PUBLICATIONS

Extended European Search Report issued in corresponding European Patent Application No. 13899333.2 dated Nov. 17, 2016 (6 pages).
International Search Report issued in PCT/JP2013/083130 dated Jan. 21, 2014 (1 page).
Written Opinion of the International Searching Authority issued in PCT/JP2013/083130 dated Jan. 21, 2014 (3 pages).
Japanese Office Action in corresponding Application No. 2014-511645 dated Aug. 1, 2014 (6 pages).
English translation of International Preliminary Report on Patentability and Written Opinion issued in corresponding International Application No. PCT/JP2013/083130 dated Jun. 23, 2016 (7 pages).
Office Action in counterpart Chinese Patent Application No. 201380079793.4 dated Aug. 10, 2017 (15 pages).

* cited by examiner

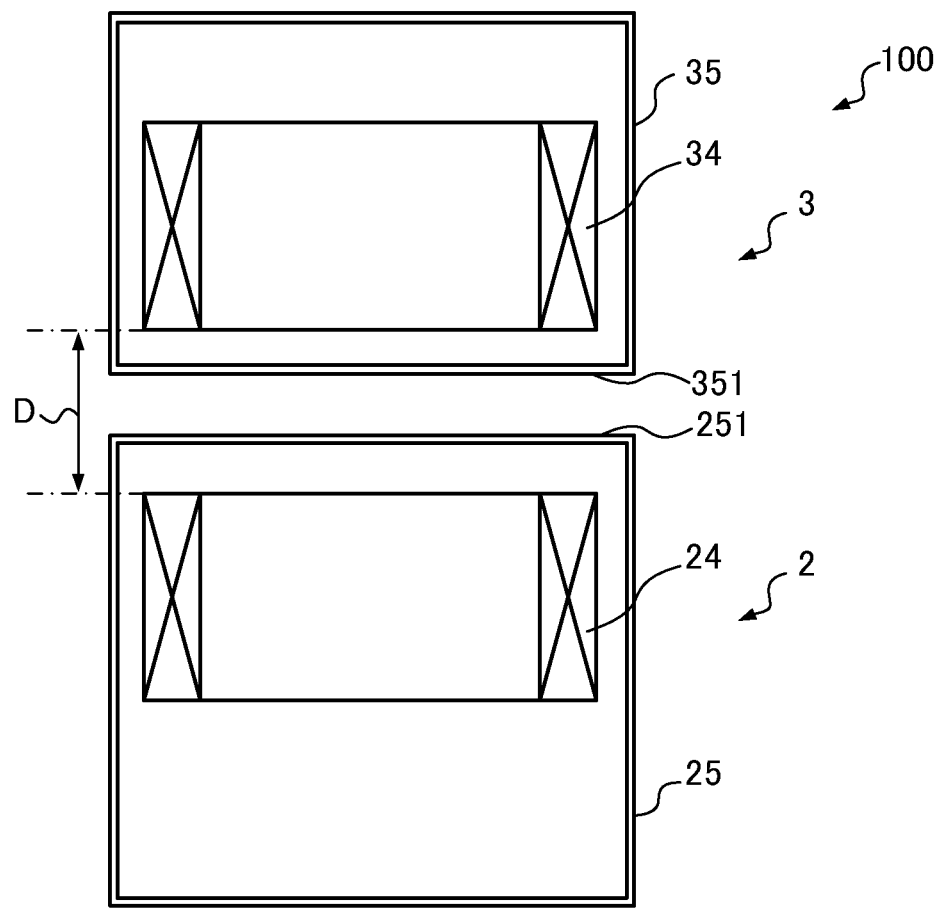
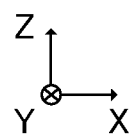
FIG. 3

POWER RECEIVING DEVICE AND POWER FEEDING SYSTEM

TECHNICAL FIELD

The present invention relates to a power receiving device and a power feeding system.

BACKGROUND ART

There is known a power feeding system that includes, for example, a power transmission device and a power receiving device (for example, PTL 1).

CITATION LIST

Patent Literature

[PTL 1] Japanese Patent Application Laid-open Publication No. 2013-70590

SUMMARY OF INVENTION

Technical Problem

For example, the power feeding system in PTL 1 adjusts a capacitance value of the capacitor, which is disposed in the power transmission device, or a similar value based on transmission efficiency of electric power between the power transmission device and the power receiving device. This power feeding system does not adjust a current supplied to the load so as to be a predetermined value. Accordingly, for example, a value of the current supplied to the load may increase, possibly damaging the load.

Solution to Problem

The present invention to solve the above-described problems is a power receiving device for receiving electric power output from a power transmission device including a primary side coil. The power receiving device is configured to supply electric power according to the electric power to a load. The power receiving device includes a secondary side coil and an adjusting device. In the secondary side coil, a second current is generated according to a first current which is supplied to the primary side coil. The adjusting device is configured to adjust a value of a third current to be a predetermined value. The third current is generated from the second current and supplied to the load.

Other features of the present invention will become apparent from descriptions of the accompanying drawings and of the present specification.

Advantageous Effects of Invention

According to the present invention, a value of a current supplied to a load can be adjusted so as to be a predetermined value.

BRIEF DESCRIPTION OF DRAWINGS

FIG. 3 is a cross-sectional view illustrating the power feeding system of the first embodiment of the present invention.

DESCRIPTION OF EMBODIMENTS

At least the following matters will become apparent from descriptions of the present specification and of the accompanying drawings.

First Embodiment

===Power Feeding System===

Figure 1:
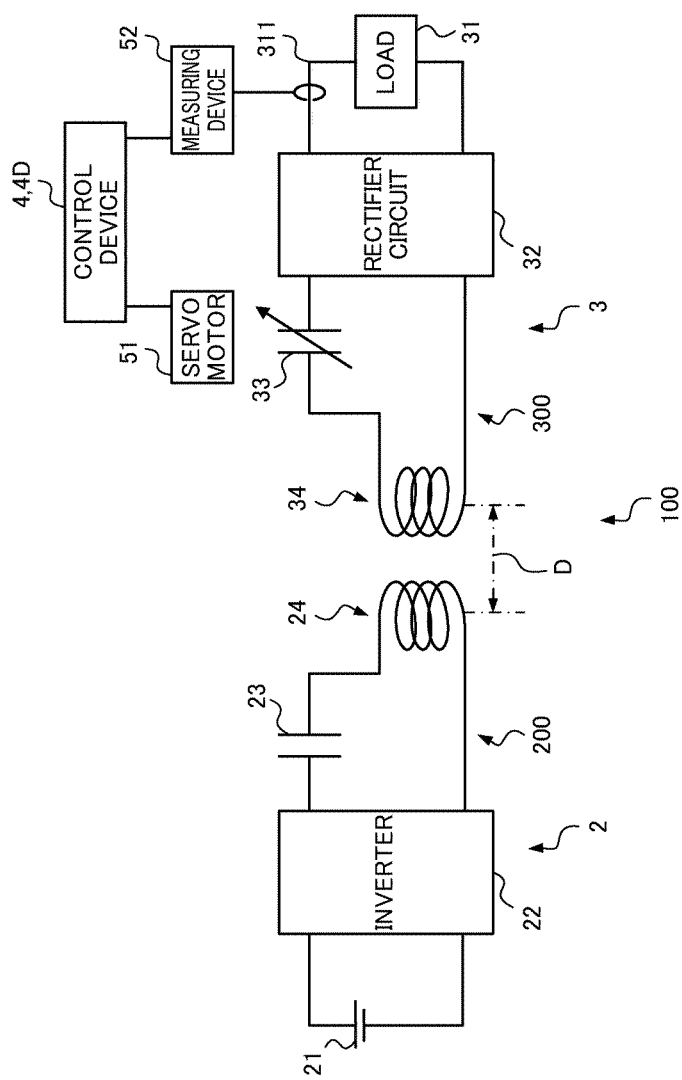
FIG. 1 is a drawing illustrating a power feeding system of a first embodiment of the present invention.

The following describes the power feeding system of the present embodiment with reference to FIG. 1. FIG. 1 is a drawing illustrating the power feeding system of the present embodiment.

A power feeding system 100 is a system that performs wireless power transmission using, for example, a resonance phenomenon in an electromagnetic field. The power feeding system 100 includes a power transmission device 2 and a power receiving device 3.

The power transmission device 2 is a device that wirelessly transmits electric power to the power receiving device 3.

The power receiving device 3 is a device that receives electric power output from the power transmission device 2 and supplies electric power according to the received electric power to a load 31.

The load 31 is an electric power load such as an electrical device that operates based on the electric power supplied from the power receiving device 3.

===Power Transmission Device===

Figure 2:
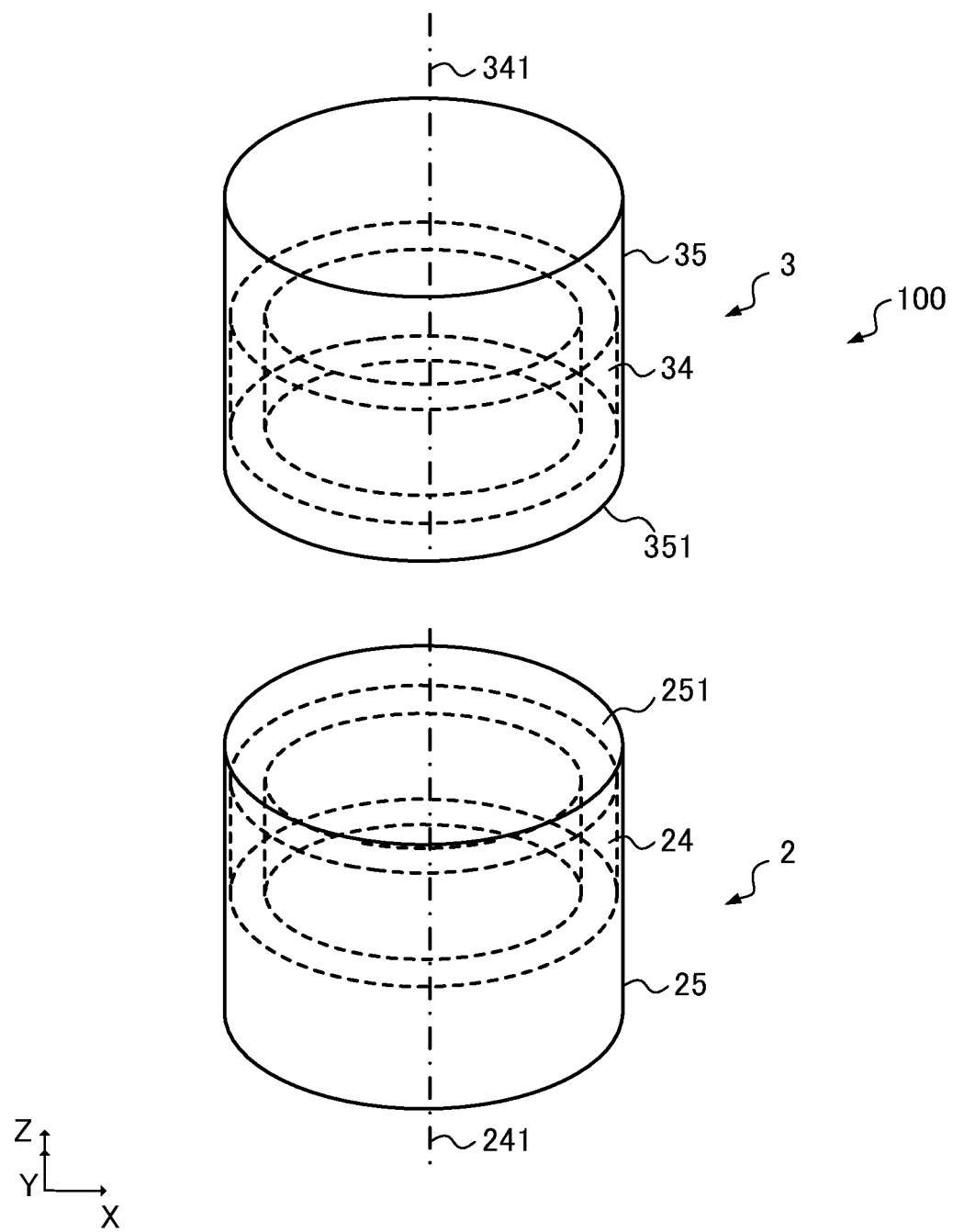
FIG. 2 is a perspective view illustrating the power feeding system of the first embodiment of the present invention.

The following describes the power transmission device of the present embodiment with reference to FIG. 1 and FIG. 2. FIG. 2 is a perspective view illustrating the power feeding system of the embodiment. Although a power transmission coil 24 and a power receiving coil 34 cannot be seen, for convenience of explanation, the power transmission coil 24 and the power receiving coil 34 are indicated by dashed lines. Additionally, a winding shaft 241 of the power transmission coil 24 and a winding shaft 341 of the power receiving coil 34 are, for convenience of explanation, indicated by one dot chain lines.

<Shape and Similar Specifications>

The power transmission device 2 includes the power transmission coil 24 and a casing 25 (FIG. 2).

The casing 25 houses a power transmission circuit 200, which includes the power transmission coil 24. The outer shape of the casing 25, for example, has a columnar shape and is formed with, for example, an insulated material such as resin.

The power transmission coil 24 is wound about the winding shaft 241, which is along the vertical direction (the Z-axis). The power transmission coil 24 is secured to a predetermined position close to the upper side (+Z) inside the casing 25.

<Circuit>

The power transmission device 2 further includes a power supply 21 (FIG. 1), an inverter 22, and a capacitor 23.

The power supply 21 generates a DC power. The inverter 22 converts a DC power supplied from the power supply 21 into an AC power. The power transmission coil 24 is a primary side coil of the power feeding system 100 to wirelessly supply the power receiving coil 34 with electric power. The capacitor 23 is used to set an impedance of the power transmission circuit 200.

One end of the power supply 21 is coupled to one end of the capacitor 23 via the inverter 22. The other end of the power supply 21 is coupled to one end of the power transmission coil 24 via the inverter 22. The other end of the power transmission coil 24 is coupled to the other end of the capacitor 23. These couplings form the power transmission circuit 200 including the power supply 21, the inverter 22, the capacitor 23, and the power transmission coil 24.

The DC power output from the power supply 21 is converted from DC into AC by the inverter 22 and is supplied to the power transmission coil 24. The AC power supplied to the power transmission coil 24 is supplied from the power transmission coil 24 to the power receiving coil 34.

===Power Receiving Device===

The following describes the power receiving device of the present embodiment with reference to FIG. 1 and FIG. 2.

<Shape and Similar Specifications>

The power receiving device 3 includes the power receiving coil 34 and a casing 35 (FIG. 2).

The casing 35 houses a power receiving circuit 300, which includes the power receiving coil 34. The outer shape of the casing 35, for example, has a columnar shape and is formed with, for example, an insulated material such as resin.

The power receiving coil 34 is wound about the winding shaft 341, which is along the vertical direction (the Z-axis). The power receiving coil 34 is secured to a predetermined position close to the lower side (−Z) inside the casing 35.

<Circuit and Similar Components>

The power receiving device 3 further includes the control device 4, a servo motor 51, a measuring device 52 (a detecting device), a rectifier circuit 32, a variable capacitor 33, and the power receiving coil 34. A control device 4 and the servo motor 51 correspond to an adjusting device.

The power receiving coil 34 is a secondary side coil of the power feeding system 100 to which electric power is wirelessly supplied from the power transmission coil 24. The rectifier circuit 32 converts an AC power supplied from the power receiving coil 34 into a DC power and supplies this converted DC power to the load 31.

The variable capacitor 33 is a capacitor that can change a capacitance value. The variable capacitor 33 includes, for example, a turning knob (not illustrated). According to an amount of turning of this turning knob, the capacitance value of the variable capacitor 33 continuously changes.

The measuring device 52 measures (detects) a current (a third current) supplied to the load 31. A measurement result by the measuring device 52 is transmitted to the control device 4. The measuring device 52 is, for example, a clamp ammeter that measures the current supplied to the load 31 in a state electrically insulated from a conductive line 311. Since the measuring device 52 is electrically insulated from the conductive line 311, this ensures reliably measuring the current without an electrical influence on the power receiving circuit 300.

One end of the power receiving coil 34 is coupled to the load 31 via the variable capacitor 33, the rectifier circuit 32, and the conductive line 311. That is, the variable capacitor 33 is coupled in series between the power receiving coil 34 and the load 31. The other end of the power receiving coil 34 is coupled to the load 31 via the rectifier circuit 32. These couplings form the power receiving circuit 300 including the power receiving coil 34, the variable capacitor 33, the rectifier circuit 32, the conductive line 311, and the load 31.

An AC power supplied to the power receiving coil 34 is converted from AC into DC by the rectifier circuit 32 and is supplied to the load 31.

That is, according to the current (a first current) supplied to the power transmission coil 24, a current (a second current) is generated in the power receiving coil 34. A current generated from the current generated in this power receiving coil 34 is supplied to the load 31. The current supplied to the load 31 is also referred to as a load current. A value of the load current is determined based on a resonant frequency or a similar value; therefore, for example, the value of the load current is determined based on a transmission distance D between the power transmission coil 24 and the power receiving coil 34 and an impedance and the like of the power receiving circuit 300.

The servo motor 51 provides a rotary power to turn the turning knob of the variable capacitor 33 to this turning knob. That is, the servo motor 51 changes the capacitance value of the variable capacitor 33. The control device 4 controls the servo motor 51.

The control device 4 controls the servo motor 51 based on the measurement result by the measuring device 52 to adjust the capacitance value of the variable capacitor 33. The control device 4 will be described later.

===Load Current===

Figure 4:
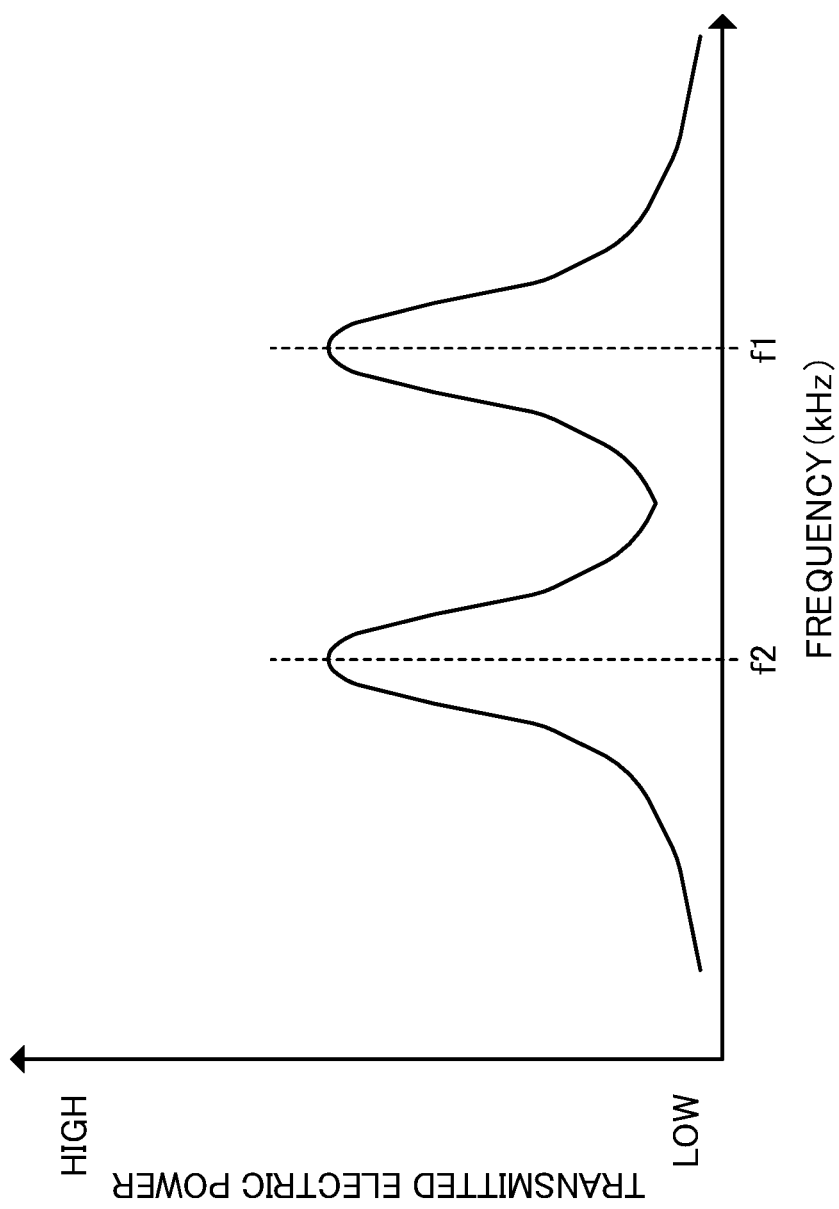
FIG. 4 is a drawing illustrating a relationship between a frequency and transmitted electric power of the first embodiment of the present invention.
Figure 5:
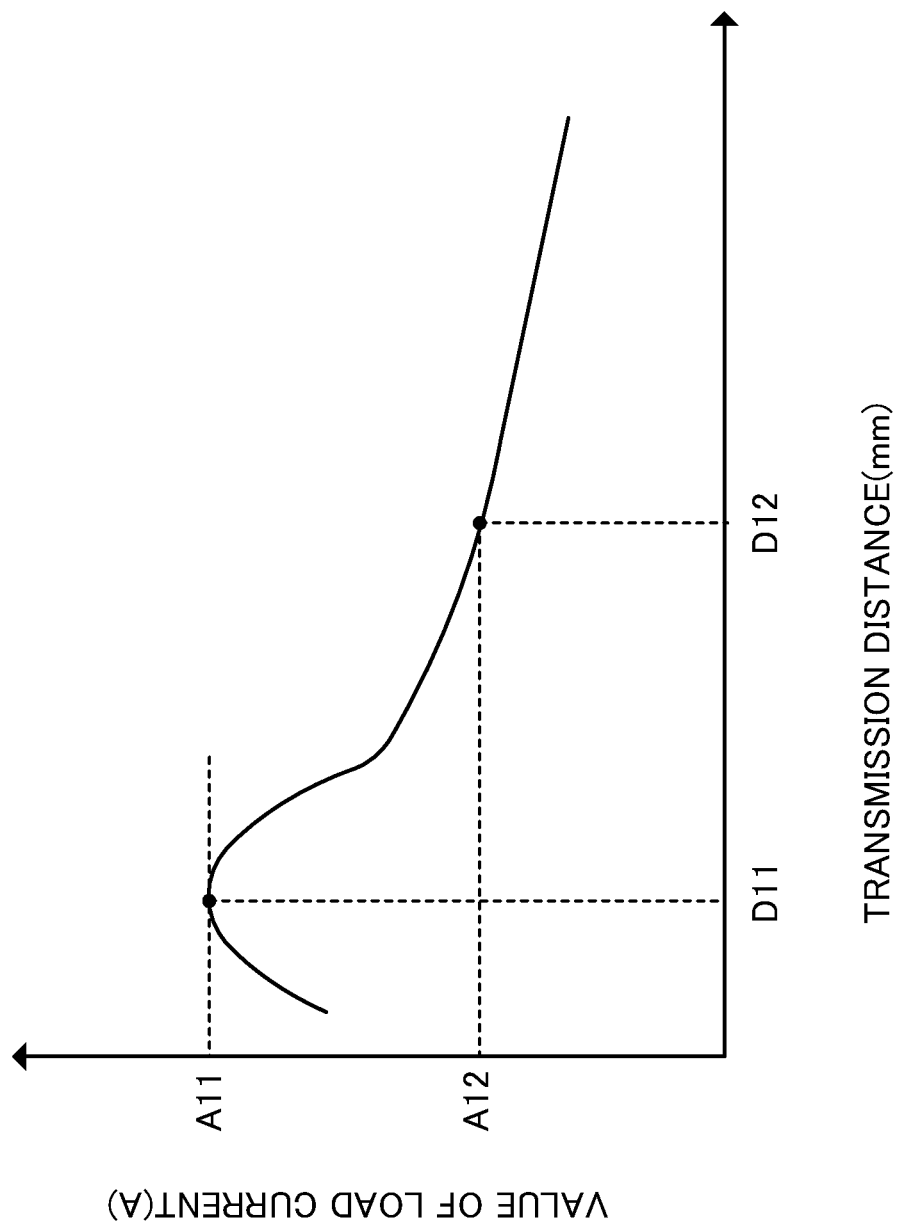
FIG. 5 is a drawing illustrating a relationship between a transmission distance and a value of a load current of the first embodiment of the present invention.

The following describes the load current of the present embodiment with reference to FIG. 3 to FIG. 5. FIG. 3 is a cross-sectional view illustrating the power feeding system of the present embodiment. FIG. 3 is a drawing viewing the power feeding system 100 from a cross section passing through an approximately center of the power feeding system 100 in FIG. 2 and parallel to an X-Z plane, toward the +Y-side. FIG. 4 is a drawing illustrating a relationship between a frequency and transmitted electric power of the present embodiment. The frequency in FIG. 4 indicates the frequency of the electric power supplied to the power receiving coil 34. The transmitted electric power indicates the electric power transmitted from the power transmission coil 24 to the power receiving coil 34. This transmitted electric power is, for example, determined based on transmission efficiency of the electric power from the power transmission coil 24 to the power receiving coil 34 and a similar specification. FIG. 5 is a drawing illustrating a relationship between the transmission distance and the value of the load current of the present embodiment.

<Load Current>

As described above, the value of the load current is determined based on the resonant frequency or a similar condition. These resonant frequencies f1 and f2 are, for example, determined based on Expression (1) to Expression (3).

[Math 1]

$$f_0 = \frac{1}{2\pi\sqrt{LC}} \quad (1)$$

$$f_1 = \frac{f_0}{\sqrt{1-k}} \quad (2)$$

$$f_2 = \frac{f_0}{\sqrt{1+k}} \quad (3)$$

L indicates values of inductances of the power transmission circuit 200 and the power receiving circuit 300, and C indicates capacitance values of the power transmission circuit 200 and the power receiving circuit 300. k indicates a coupling coefficient between the power transmission coil 24 and the power receiving coil 34.

The value of the coupling coefficient k changes according to the transmission distance D. Alternatively, a unique resonant frequency $f_0$ varies according to the capacitance value of the power receiving circuit 300. That is, the resonant frequencies $f_1$ and $f_2$ vary according to the transmission distance D and the capacitance value of the variable capacitor 33. Accordingly, if the transmission distance D varies, the adjustment of the capacitance value of the variable capacitor 33 ensures maintaining the values of the resonant frequencies $f_1$ and $f_2$ constant.

<Settings of Power Transmission Device and Power Receiving Device>

The power transmission device 2 and the power receiving device 3 are configured, for example, such that the value of the load current becomes a predetermined value A11 with an opposed surface 251 of the power transmission device 2 brought in contact which an opposed surface 351 of the power receiving device 3. The predetermined value A11 is a specified value determined based on the specification of the load 31 and a similar condition. When the load current at the predetermined value A11 is supplied to the load 31, this load 31 operates normally. The transmission distance D when the opposed surface 251 and the opposed surface 351 are in contact with one another is referred to as a transmission distance D11. Further, the power transmission device 2 and the power receiving device 3 are configured such that electric power can be transmitted at a frequency any of the resonant frequency $f_1$, the resonant frequency $f_2$, or a frequency at the proximity of these frequencies with the opposed surface 251 in contact with the opposed surface 351.

That is, for example, the power transmission device 2 and the power receiving device 3 are configured to meet the following. The frequency of the electric power output from the power transmission coil 24 when the transmission distance D is set to the transmission distance D11 matches or is at the proximity of one of the resonant frequency $f_1$ or the resonant frequency $f_2$. Additionally, the value of the load current when the transmission distance D is set to the transmission distance D11 becomes the predetermined value A11 or a value at the proximity of the predetermined value A11. "The power receiving device 3 is configured" means that, for example, the capacitance value of the variable capacitor 33 is set.

<Maintenance of Value of Load Current>

When the transmission distance D becomes a transmission distance D12 (a second distance), which is longer than the transmission distance D11 (a first distance), a variation of the values of the resonant frequencies $f_1$ and $f_2$ reduces the value of the load current from the predetermined value A11 to a current value A12, which is lower than the predetermined value A11. At this time, adjusting the capacitance value of the variable capacitor 33 ensures returning the values of the resonant frequencies $f_1$ and $f_2$ to the values of the resonant frequencies $f_1$ and $f_2$ when the transmission distance D is the transmission distance D11. Returning the values of the resonant frequencies $f_1$ and $f_2$ maintains the value of the load current to the predetermined value A11.

===Control Device===

Figure 6:
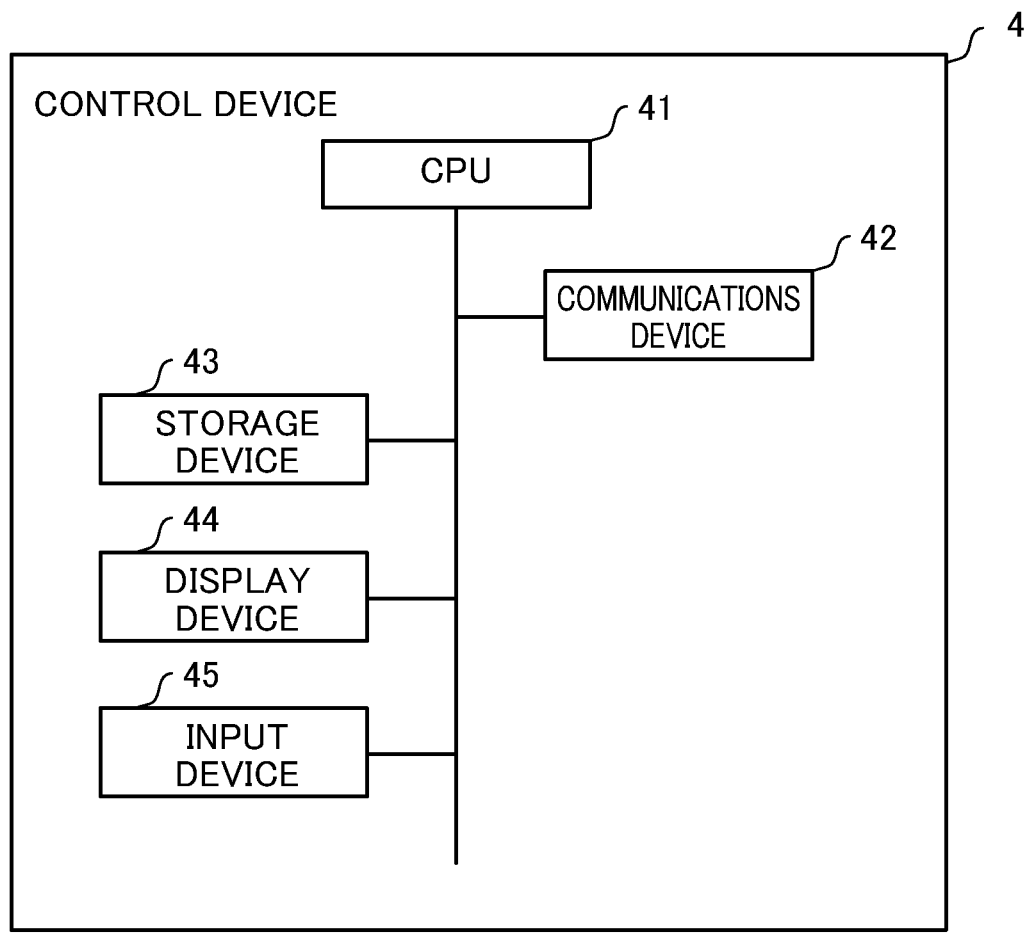
FIG. 6 is a drawing illustrating hardware of a control device of the first embodiment of the present invention.
Figure 7:
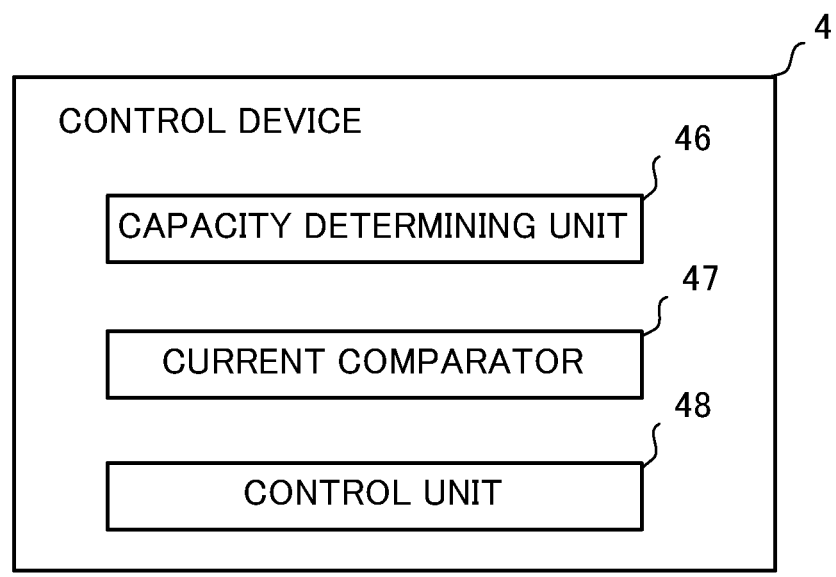
FIG. 7 is a drawing illustrating functions of the control device of the first embodiment of the present invention.

The following describes the control device of the present embodiment with reference to FIG. 6 and FIG. 7. FIG. 6 is a drawing illustrating hardware of the control device of the present embodiment. FIG. 7 is a drawing illustrating functions of the control device of the present embodiment.

The control device 4 includes a Central Processing Unit (CPU) 41, a communications device 42, a storage device 43, a display device 44, and an input device 45. The CPU 41 executes a program stored in the storage device 43 to achieve various functions of the control device 4 and to integrally control the control device 4. The storage device 43 stores the above-described programs and various pieces of information. The display device 44 is a display to display information on the control device 4. The input device 45 is, for example, a keyboard and a computer mouse to input information to the control device 4. The communications device 42 performs communications between the servo motor 51 and the measuring device 52.

The control device 4 further includes a capacity determining unit 46, a current comparator 47, and a control unit 48 (also referred to as "various functions of the control device 4"). The execution of the program stored in the storage device 43 by the CPU 41 achieves the various functions of the control device 4.

The capacity determining unit 46 determines whether the capacitance value of the variable capacitor 33 is an upper limit value or not and whether the capacitance value of the variable capacitor 33 is a lower limit value or not. The upper limit value and the lower limit value are determined based on the specification of the variable capacitor 33 and a similar condition. The capacitance value of the variable capacitor 33 is adjustable within an adjustment range between the upper limit value and the lower limit value. Information indicative of the upper limit value and the lower limit value is, for example, input from the input device 45 and is stored in the storage device 43. The capacity determining unit 46 may perform the above-described determinations based on the amount of turning of the turning knob of the variable capacitor 33.

The current comparator 47 compares respective values of load currents measured at timings different from one another. The measured values of the load currents mean the values of the load currents measured by the measuring device 52. "[T]imings different from one another" means, for example, different timings and different times.

The control unit 48 controls the servo motor 51 based on the determination result by the capacity determining unit 46, the comparison result by the current comparator 47, and a similar result to adjust the capacitance value of the variable capacitor 33.

===Operations of Control Device===

Figure 8:
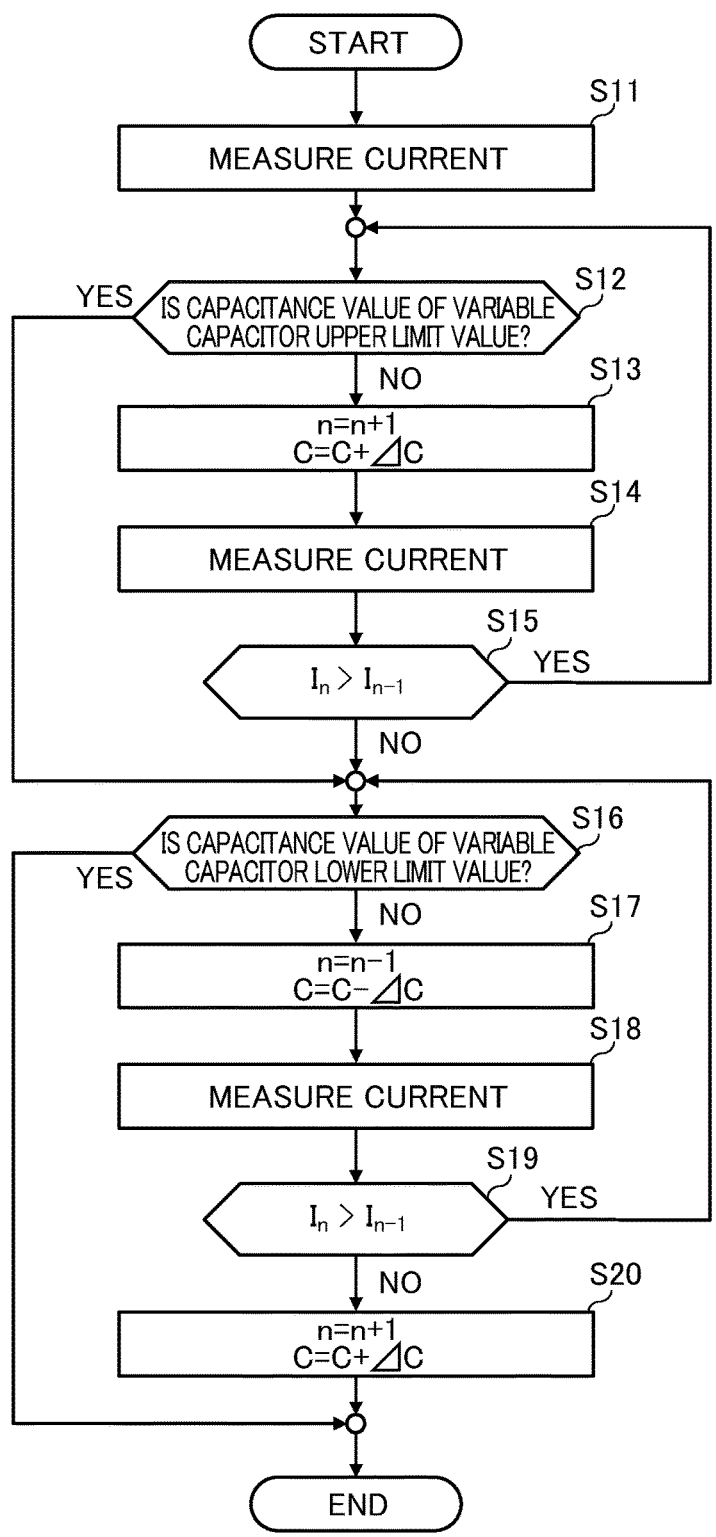
FIG. 8 is a flowchart illustrating operations of the control device of the first embodiment of the present invention.
Figure 9:
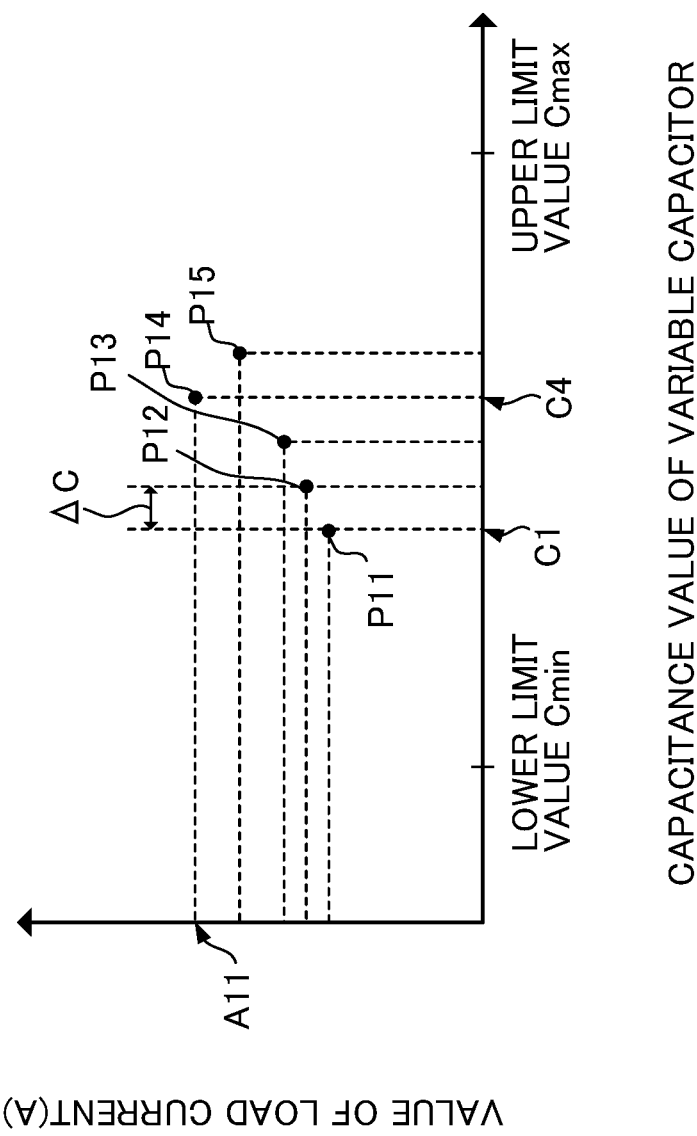
FIG. 9 is a drawing illustrating an example of a relationship between a capacitance value of a variable capacitor and a value of a load current of the first embodiment of the present invention.

The following describes operations of the control device of the present embodiment with reference to FIG. 8 and FIG. 9. FIG. 8 is a flowchart illustrating the operations of the control device of the present embodiment. FIG. 9 is a drawing illustrating an example of a relationship between the capacitance value of the variable capacitor and the value of the load current of the present embodiment.

<Operations>

For example, when the transmission distance D changes from the transmission distance D11 to the transmission distance D12, the control device 4 starts operating. For example, the control device 4 may start operating based on a start signal input to the input device 45. Alternatively, for example, the control device 4 may start operating at every predetermined period (several ms).

The measuring device 52 measures the load current (Step S11). The capacity determining unit 46 determines whether the capacitance value of the variable capacitor 33 is the upper limit value or not (Step S12).

When the capacity determining unit 46 determines that the capacitance value of the variable capacitor 33 is not the upper limit value (NO at Step S12), the control unit 48 increases the capacity of the variable capacitor 33 by a predetermined value ΔC (Step S13). At this time, a value of a variable n is incremented by 1. The measuring device 52 measures the load current again (Step S14). The current comparator 47 compares a value of a load current measured immediately before (also referred to as "a first load current") with a value of a load current measured immediately before the first load current (also referred to as "a second load current") (Step S15). In this case, for example, the first load current corresponds to the load current at Step S14, and the second load current corresponds to the load current at Step S11.

When the value of the first load current is larger than the value of the second load current (YES at Step S15), the control device 4 performs the determination at Step S12 again. On the other hand, when the value of the first load current is smaller than the value of the second load current (NO at Step S15), the capacity determining unit 46 determines whether the capacitance value of the variable capacitor 33 is the lower limit value or not (Step S16).

When the capacity determining unit 46 determines that the capacitance value of the variable capacitor 33 is not the lower limit value (NO at Step S16), the control unit 48 decreases the capacity of the variable capacitor 33 by the predetermined value ΔC (Step S17). At this time, the value of the variable n is decremented by 1. The measuring device 52 measures the load current again (Step S18).

The current comparator 47 compares the value of the first load current with the value of the second load current (Step S19). When the value of the first load current is smaller than the value of the second load current (YES at Step S19), the control device 4 performs the determination at Step S16 again. On the other hand, when the value of the first load current is larger than the value of the second load current (NO at Step S19), the control unit 48 increases the capacity of the variable capacitor 33 by the predetermined value ΔC and then terminates the operation.

In the determination at Step S12, when the capacity determining unit 46 determines that the capacitance value of the variable capacitor 33 is the upper limit value (YES at Step S12), the control device 4 performs the determination at Step S16.

In the determination at Step S16, when the capacity determining unit 46 determines that the capacitance value of the variable capacitor 33 is the lower limit value (YES at Step S12), the control device 4 terminates the control operation.

<Example of Operation (FIG. 9)>

The following describes the case where, for example, the capacitance value of the variable capacitor 33 when the control device 4 starts operating is C1 and the value of the load current when the capacitance value of the variable capacitor 33 is C4 is the predetermined value A11 as an example.

In this case, after executions of Step S13 three times, Step S17 is executed once, and the state changes from the state shown in P11 in FIG. 9 to the states shown in P12, P13, P14, and P15. After this, the execution of Step S20 changes the state to the state of P14 again. Thus, the value of the load current becomes the predetermined value A11.

Thus, the control device 4 adjusts the capacitance value of the variable capacitor 33 such that the value of the load current becomes the maximum value. Then, when the value of the load current reaches the maximum value, the value of this load current becomes the predetermined value A11. This is because that the power transmission device 2 and the power receiving device 3 are configured such that the frequency of the electric power output from the power transmission coil 24 matches or is at the proximity of one of the resonant frequency $f_1$ or the resonant frequency $f_2$ when the transmission distance D is set to the transmission distance D11, and the value of the load current becomes the predetermined value A11 or a value at the proximity of the predetermined value A11 when the transmission distance D is set to the transmission distance D11.

Second Embodiment

In a power receiving device 3B of the second embodiment, the variable capacitor 33 and the control device 4 in the power receiving device 3 of the first embodiment are changed to a variable capacitor device 33B and a control device 4B, respectively.

===Power Receiving Device===

Figure 10:
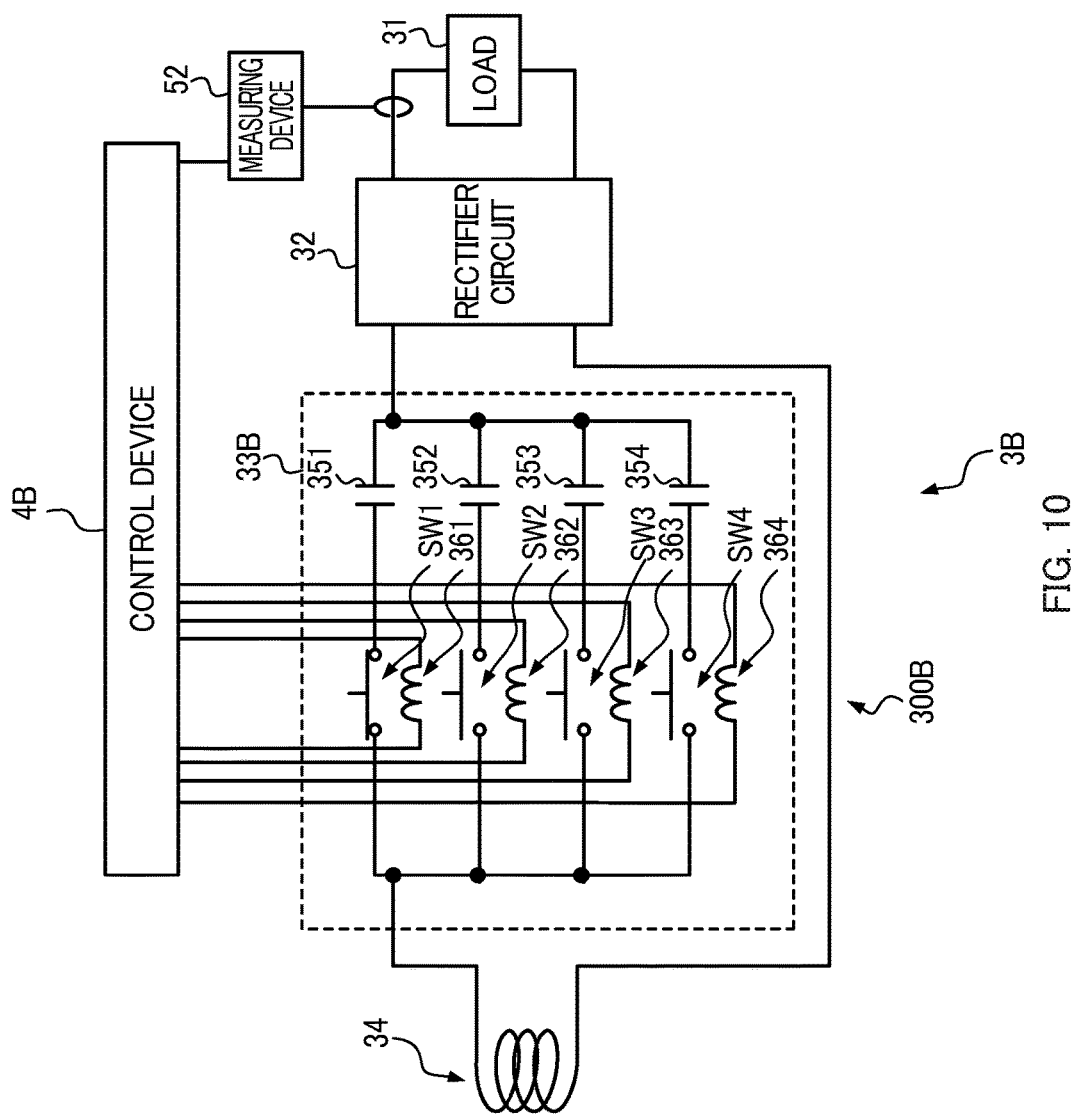
FIG. 10 is a drawing illustrating a power receiving device of a second embodiment of the present invention.

The following describes the power receiving device of the present embodiment with reference to FIG. 10. FIG. 10 is a drawing illustrating the power receiving device of the present embodiment. In FIG. 10, like reference numerals designate identical elements to the elements of FIG. 1. Therefore, the overlapped description will not be further elaborated here.

The power receiving device 3B includes the variable capacitor device 33B and the control device 4B.

The variable capacitor device 33B functions as a variable capacitor that ensures adjusting a capacitance value in a power receiving circuit 300B by stages. The variable capacitor device 33B includes fixed capacitors 351 to 354, switches SW1 to SW4, and energized coils 361 to 364.

Capacitance values of the fixed capacitors 351 to 354 are fixed to respective different values. One ends of the fixed capacitors 351 to 354 are coupled to the rectifier circuit 32. The other ends of the fixed capacitors 351 to 354 are coupled to one end of the power receiving coil 34 via the switches SW1 to SW4, respectively.

The respective switches SW1 to SW4 are relay switches turning on and off by a supply or cutoff of a current to the energized coils 361 to 364.

The control device 4B appropriately supplies or cuts off the current to the energized coils 361 to 364 such that the value of the load current becomes a value corresponding to the predetermined value A11. That is, the control device 4B adjusts a value of an impedance of the power receiving circuit 300B by stages as necessary such that the value of the load current becomes the value corresponding to the predetermined value A11. The control device 4B may perform a control similar to the control device 4.

Third Embodiment

In a power receiving device 3C of the third embodiment, the variable capacitor 33, the control device 4, and the servo motor 51 in the power receiving device 3 of the first embodiment are changed to a fixed capacitor 33C, a control device 4C, and a servo motor 51C, respectively. The power receiving device 3C further adds a magnetic material 342 and an actuator 53 to the power receiving device 3.

===Power Receiving Device===

Figure 11:
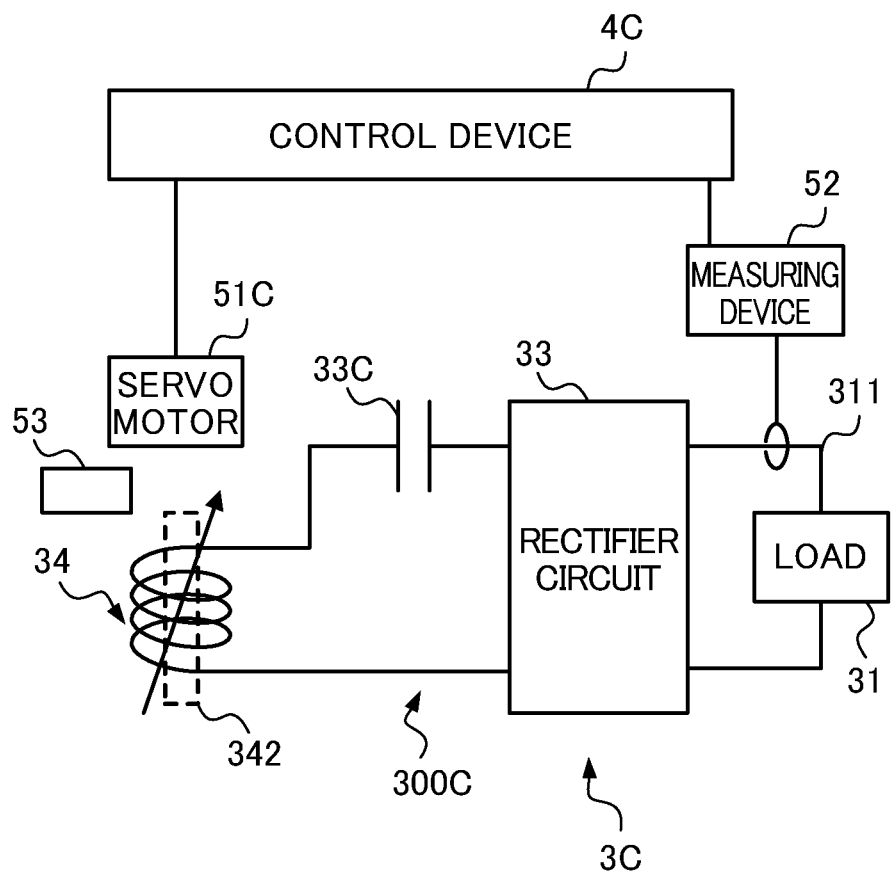
FIG. 11 is a drawing illustrating a power receiving device of a third embodiment of the present invention.

The following describes the power receiving device of the present embodiment with reference to FIG. 11. FIG. 11 is a drawing illustrating the power receiving device of the present embodiment. In FIG. 11, like reference numerals designate identical elements to the elements of FIG. 1. Therefore, the overlapped description will not be further elaborated here.

The power receiving device 3C includes the fixed capacitor 33C, the magnetic material 342, the servo motor 51C, the actuator 53, and the control device 4C. The servo motor 51C, the actuator 53, and the control device 4C correspond to an adjusting device and a moving device.

The fixed capacitor 33C is configured to have a constant capacitance value.

The magnetic material 342 is, for example, a ferrite disposed near the power receiving coil 34. The magnetic material 342 has a long shape along the winding shaft 341 (FIG. 2) of the power receiving coil 34.

The servo motor 51C is controlled by the control device 4C and provides a driving power to the actuator 53 to move the magnetic material 342.

The actuator 53 moves the magnetic material 342 along the winding shaft 341 by the driving force provided from the servo motor 51C. The actuator 53 moves the magnetic material 342 between the inside of the tubularly wound power receiving coil 34 and the outside of the power receiving coil 34. Based on this movement of the magnetic material 342, the impedance of a power receiving circuit 300C including the load 31 changes.

The control device 4C controls the movement of the magnetic material 342 via the servo motor 51C and the actuator 53. The control device 4C moves the magnetic material 342 such that the value of the load current becomes the predetermined value A11. The control device 4C may perform a control similar to the control device 4.

Fourth Embodiment

In the power receiving device of the fourth embodiment, the control device 4 in the power receiving device 3 of the first embodiment is changed to a control device 4D (FIG. 1).

===Power Receiving Device===

Figure 12:
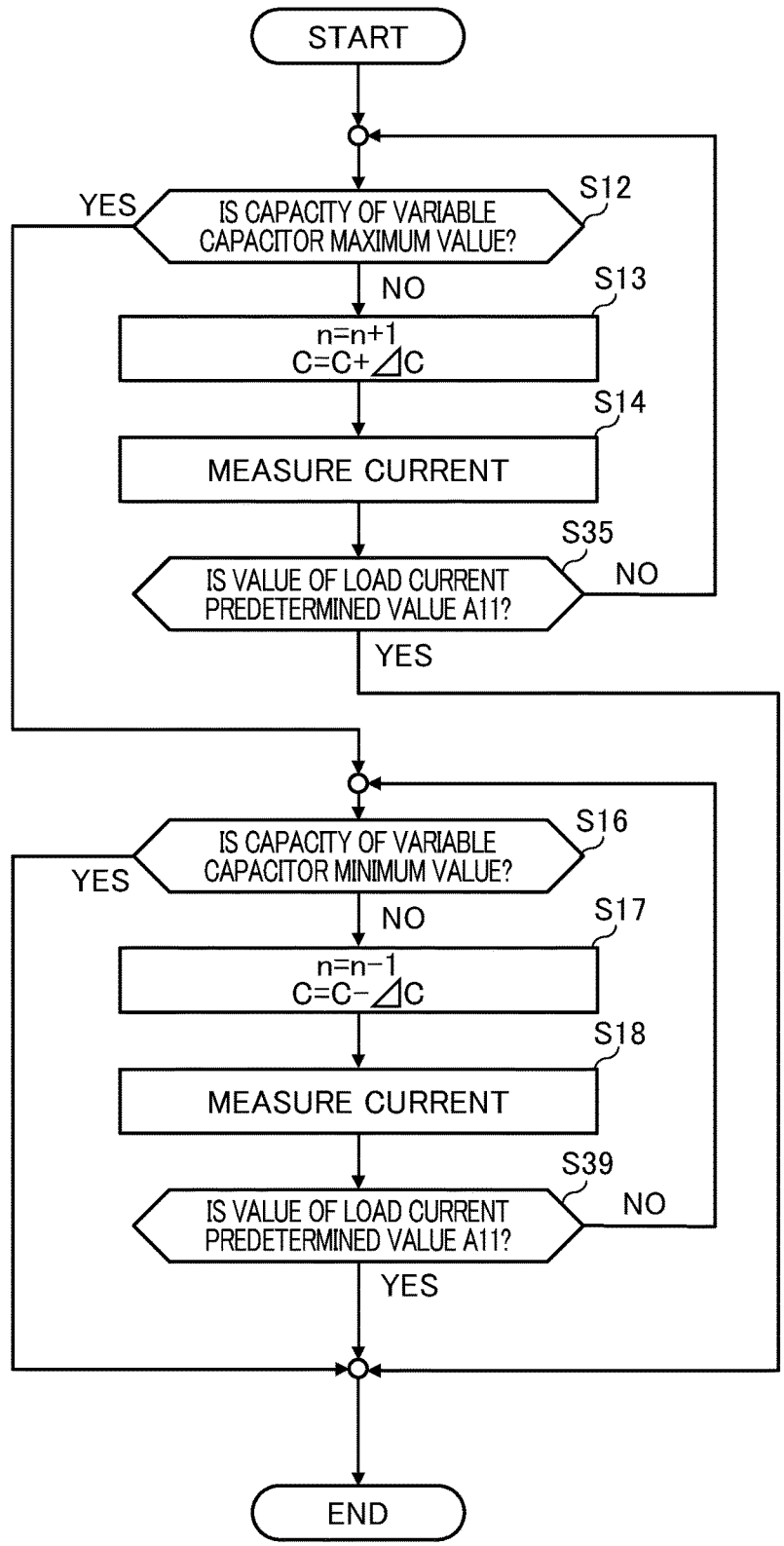
FIG. 12 is a flowchart illustrating operations of a power receiving device of a fourth embodiment of the present invention.

The following describes a power receiving device according to the present embodiment with reference to FIG. 12.

FIG. 12 is a flowchart illustrating operations of the power receiving device of the present embodiment. In FIG. 12, like steps designate identical elements to the steps of FIG. 8. Therefore, the overlapped description will not be further elaborated here.

After the operation at Step S14, the control device 4D determines whether the value of the load current is the predetermined value A11 or not (Step S35). When the value of the load current is the predetermined value A11 (YES at Step S35), the control device 4D terminates the control operation. On the other hand, when the value of the load current is not the predetermined value A11 (NO at Step S35), the control device 4D performs the determination at Step S12.

After the operation at Step S18, the control device 4D performs the determination at Step S39. The determination at Step S39 is a determination similar to the determination at Step S35. When the determination at Step S39 is YES, the control device 4D terminates the control operation. When the determination at S39 is NO, the control device 4D performs the determination at Step S16. In the case where the control device 4D does not terminate the operation based on the above-described control or a similar control within a predetermined time, the control device 4D may be configured to terminate the operation when a difference between the value of the load current and the predetermined value A11 falls within a predetermined range.

Therefore, for example, varying the impedance of the receiving circuit 300 ensures reliably adjusting the value of the load current.

Fifth Embodiment

In a power receiving device of the fifth embodiment, the control device 4 and the variable capacitor 33 in the power receiving device 3 of the first embodiment are changed to a control device 4E and a variable capacitor 33E, respectively.

===Power Receiving Device===

Figure 13:
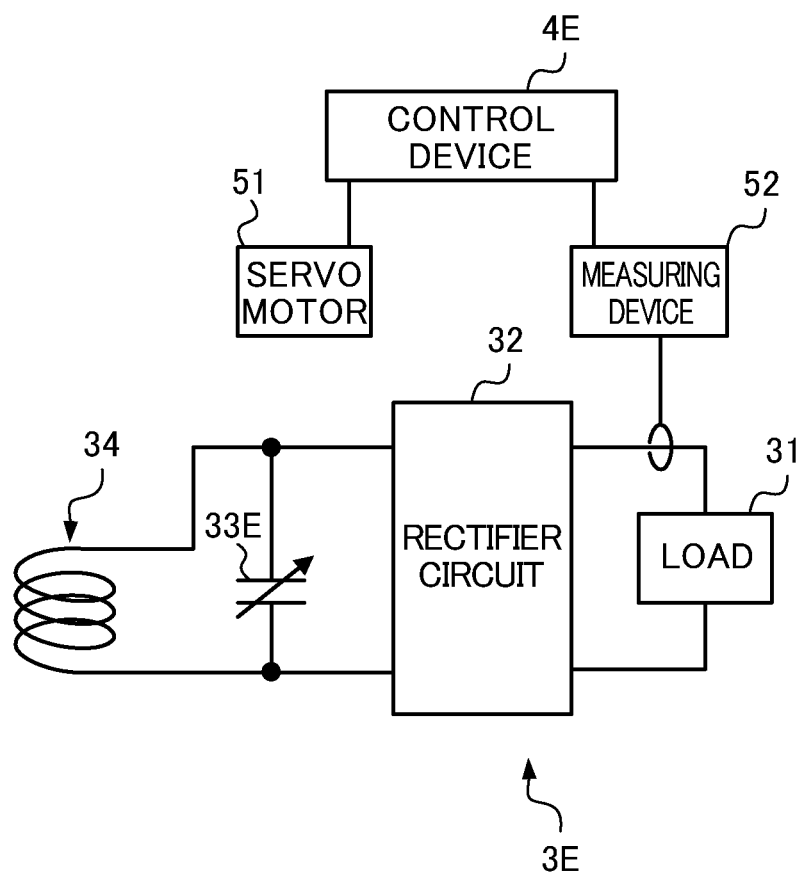
FIG. 13 is a drawing illustrating a power receiving device of a fifth embodiment of the present invention.

The following describes the power receiving device of the present embodiment with reference to FIG. 13. FIG. 13 is a drawing illustrating the power receiving device of the present embodiment. In FIG. 13, like reference numerals designate identical elements to the elements of FIG. 1. Therefore, the overlapped description will not be further elaborated here.

A power receiving device 3E includes the control device 4E, a servo motor 51E, and the variable capacitor 33E.

A configuration of the variable capacitor 33E is similar to a configuration of the variable capacitor 33 (FIG. 1). The variable capacitor 33E is coupled in parallel to the load 31 and the power receiving coil 34.

The control device 4E adjusts a capacitance value of the variable capacitor 33E via the servo motor 51E such that the value of the load current becomes the predetermined value A11.

As described above, the power receiving device 3 (FIG. 1) receives the electric power output from the power transmission device 2, which includes the power transmission coil 24, and supplies the electric power according to the received electric power to the load 31. The power receiving device 3 includes the power receiving coil 34, the control device 4, and the servo motor 51. The power receiving coil 34 generates a current according to the current supplied to the power transmission coil 24. The control device 4 adjusts the value of the load current generated from the current generated in the power receiving coil 34 so as to be the predetermined value A11 via the servo motor 51. Therefore, the adjustment of the value of the load current to the predetermined value A11 is possible. Additionally, without a change in the setting of the power transmission device 2, only the adjustment of the capacitance value of the variable capacitor 33 ensures setting the value of the load current to the predetermined value A11. Accordingly, even in the case where a plurality of power receiving devices configured similar to the power receiving device 3 are disposed for the power transmission device 2, the values of the load currents can be set to the predetermined value A11 in the plurality of respective power receiving devices. Additionally, in the case where the power receiving device 3 is disposed at a position by which the transmission distance D is longer than the transmission distance D11, this embodiment improves the transmission efficiency and ensures the value of the load current so as to be the predetermined value A11. Simplifying the power receiving circuit 300 in the power receiving device 3 ensures downsizing the power receiving device 3 and reducing the production cost.

The power receiving device 3 includes the measuring device 52. The measuring device 52 measures the load current. The control device 4 adjusts the value of the load current so as to be the predetermined value A11 based on the measurement result by the measuring device 52. Therefore, the value of the load current can be reliably set to be the predetermined value A11.

The power receiving device 3 includes the variable capacitor 33. The variable capacitor 33, which is a capacitor coupled between the power receiving coil 34 and the load 31, can change the capacitance value. The control device 4 adjusts the capacitance value of the variable capacitor 33 via the servo motor 51 based on the measurement result by the measuring device 52.

The variable capacitor 33 is coupled in series with respect to the power receiving coil 34 and the load 31. Assume the case where the transmission distance D1 changes from the transmission distance D11 to the transmission distance D12, which is longer than the transmission distance D11, while the capacitance value of the variable capacitor 33 is set (adjusted) such that the value of the load current becomes the predetermined value A11 at the transmission distance D being the transmission distance D11. The control device 4 prioritizes the increase of the capacitance value (Step S13 in FIG. 8) within the adjustment range, which is set by the upper limit value and the lower limit value of the capacitance value of the variable capacitor 33, over the reduction of the capacitance value (Step S17 in FIG. 8). Thus, the control device 4 adjusts the capacitance value of the variable capacitor 33. This allows returning the values of the resonant frequencies $f_1$ and $f_2$ varied by the variation of the transmission distance D in a comparatively short time. Additionally, the reduction of the impedance of the power receiving circuit 300 ensures increasing the value of the load current decreased due to the variation of the transmission distance D. Therefore, the value of the load current, which has varied due to the variation of the transmission distance D, can be set to the predetermined value A11 in a comparatively short time.

The capacitance value of the variable capacitor 33 continuously changes. Accordingly, the value of the load current can be reliably set to the predetermined value A11.

The power receiving device 3B (FIG. 10) includes the variable capacitor device 33B. The capacitance value of the variable capacitor device 33B changes by stages. This eliminates a need for fine adjustment of the capacitance value of the variable capacitor device 33B or a similar adjustment. Therefore, the value of the load current can be set to the predetermined value A11 in a comparatively short time.

The power receiving device 3C (FIG. 11) includes the magnetic material 342, the control device 4C, the servo motor 51C, and the actuator 53. The magnetic material 342 is disposed near the power receiving coil 34. The control device 4C moves the magnetic material 342 via the servo motor 51C and the actuator 53 based on the measurement result by the measuring device 52 to adjust the value of the mutual inductance between the power receiving coil 34 and a magnetic material 342 such that the value of the load current becomes the predetermined value A11. Accordingly, the impedance of the power receiving circuit 300C can be adjusted without coupling an element such as a capacitor, which is to adjust the impedance of the power receiving circuit 300C, to the power receiving coil 34. This ensures providing the power receiving device 3C that can be manufactured comparatively easy, without changing the relationship of coupling of the power receiving circuit 300C.

The power receiving coil 34 is tubularly wound. The control device 4C moves the magnetic material 342 along the winding shaft 341 of the power receiving coil 34 between the inside and the outside of the power receiving coil 34. This ensures comparatively widening an adjustment width of the mutual inductance between the power receiving coil 34 and the magnetic material 342. Therefore, the value of the load current can be reliably set to the predetermined value A11.

The magnetic material 342 has the long shape along the winding shaft 341. This ensures comparatively decreasing an amount of variation of the mutual inductance between the power receiving coil 34 and the magnetic material 342 with respect to the amount of movement of the magnetic material 342. This ensures preventing an overcurrent from being supplied to the load 31 by a rapid variation of the impedance of the power receiving circuit 300.

The first to fifth embodiments are intended for easy understanding of the present invention and are not in any way to be construed as limiting the present invention. The present invention may be modified and improved without departing from the scope of the invention, and equivalents thereof are also encompassed by the invention.

The first embodiment describes that the power transmission device 2 transmits the electric power to the power receiving device 3. However, this should not be construed in a limiting sense. For example, the power transmission device 2 may supply the electric power to a plurality of power receiving devices with the configuration similar to the power receiving device 3.

The fourth embodiment describes that the control device 4D performs the control such that the value of the load current becomes the predetermined value A11. However, this should not be construed in a limiting sense. For example, the control device 4D may perform a control such that the value of the load current becomes the maximum value. "[T]he value of the load current becomes the maximum value" means that the value of the load current becomes the maximum when the capacitance value of the variable capacitor 33 is adjusted between the lower limit value and the upper limit value. Alternatively, for example, the control device 4D may perform a control such that the value of the load current becomes the predetermined value. This ensures preventing the overcurrent from being supplied to the load 31 and damaging the load 31. Alternatively, for example, the control device 4D may perform a control such that the value of the load current becomes within a predetermined range. The predetermined range is within the range between the upper limit value and the lower limit value including the predetermined value A11 and may be determined based on the specification of the load 31 or a similar condition.

The first embodiment describes that the measuring device 52 is the clamp ammeter. However, this should not be construed in a limiting sense. For example, the measuring device 52 may be an ammeter that measures a current based on a voltage generated in both ends of a shunt resistance.

The third embodiment describes that the magnetic material 342 is moved between the inside of the power receiving coil 34 and the outside of the power receiving coil 34. However, this should not be construed in a limiting sense. For example, the magnetic material 342 may be moved only at the outside of the power receiving coil 34. Alternatively, the magnetic material 342 may be moved only at the inside of the power receiving coil 34.

REFERENCE SIGNS LIST 2 power transmission device
3, 3B, 3C, 3E power receiving device
4, 4B, 4C, 4D, 4E control device
24 power transmission coil
33, 33E variable capacitor
33B variable capacitor device
34 power receiving coil
100 power feeding system

The invention claimed is:

1. A power receiving device that receives electric power output from a power transmission device including a primary side coil and supplies electric power according to the electric power to a load, the power receiving device comprising:
a secondary side coil where a second current is generated according to a first current supplied to the primary side coil;
an adjusting device that adjusts a value of a third current to be a predetermined value, the third current is generated from the second current and supplied to the load;
a detecting device that detects the third current; and
a variable capacitor coupled between the secondary side coil and the load, wherein:
the variable capacitor ensures a changeable capacitance value,
the adjusting device performs an adjustment based on a detection result by the detecting device,
the variable capacitor is coupled in series with respect to the secondary side coil and the load,
the adjusting device comprising
a first adjusting device that increases the capacitance value, and
a second adjusting device that decreases the capacitance value, wherein
the first adjusting device adjusts the capacitance value within an adjustment range of the capacitance value preferentially over the second adjusting device,
when a distance between the secondary side coil and the primary side coil changes from a first distance to a second distance longer than the first distance while the capacitance value is adjusted such that the value of the third current becomes the predetermined value at the distance between the secondary side coil and the primary side coil is the first distance.

2. The power receiving device according to claim 1, wherein the capacitance value of the variable capacitor continuously changes.

3. The power receiving device according to claim 1, wherein the capacitance value of the variable capacitor changes by stages.

4. The power receiving device according to claim 1, further comprising a magnetic material disposed near the secondary side coil, wherein the adjusting device includes a moving device that moves the magnetic material based on the detection result by the detecting device to adjust a value of a mutual inductance between the secondary side coil and the magnetic material such that the value of the third current becomes a predetermined value.

5. The power receiving device according to claim 4, wherein:
the secondary side coil is tubularly wound, and
the moving device moves the magnetic material along a winding shaft of the secondary side coil between an inside of the secondary side coil and an outside of the secondary side coil.

6. The power receiving device according to claim 5, wherein the magnetic material has a long shape along the winding shaft.

7. A power feeding system, comprising:
a power transmission device including a primary side coil; and
a power receiving device that receives electric power output from the power transmission device and supply electric power according to the electric power to a load, wherein the power receiving device includes:
a secondary side coil where a second current is generated according to a first current supplied to the primary side coil; and
an adjusting device that adjusts a value of a third current according to the second current to be a predetermined value
a detecting device that detects the third current; and
a variable capacitor coupled between the secondary side coil and the load, wherein:
the variable capacitor ensures a changeable capacitance value,
the adjusting device performs an adjustment based on a detection result by the detecting device,
the variable capacitor is coupled in series with respect to the secondary side coil and the load,
the adjusting device comprising
a first adjusting device that increases the capacitance value, and
a second adjusting device that decreases the capacitance value, wherein
the first adjusting device adjusts the capacitance value within an adjustment range of the capacitance value preferentially over the second adjusting device,
when a distance between the secondary side coil and the primary side coil changes from a first distance to a second distance longer than the first distance while the capacitance value is adjusted such that the value of the third current becomes the predetermined value at the distance between the secondary side coil and the primary side coil is the first distance.

* * * * *